United States Patent [19]

Momotani et al.

[11] Patent Number: 5,614,805
[45] Date of Patent: Mar. 25, 1997

[54] METHOD AND APPARATUS FOR CHARGING A SECONDARY BATTERY BY SUPPLYING PULSED CURRENT AS CHARGING CURRENT

[75] Inventors: Hiroshi Momotani; Etsuo Otsuki; Akio Hasebe; Tamiko Takeuchi, all of Sendai, Japan

[73] Assignee: Tokin Corporation, Miyagi-ken, Japan

[21] Appl. No.: 50,830

[22] Filed: Apr. 20, 1993

[30] Foreign Application Priority Data

Nov. 19, 1992 [JP] Japan .................................. 4-335283
Dec. 21, 1992 [JP] Japan .................................. 4-339956

[51] Int. Cl.⁶ .................................................. H01M 10/44
[52] U.S. Cl. ............................................... 320/21; 320/21
[58] Field of Search ............................ 320/21, 22, 23, 320/24

[56] References Cited

U.S. PATENT DOCUMENTS

| | | | |
|---|---|---|---|
| 3,963,976 | 6/1976 | Clark | 320/21 |
| 4,645,996 | 2/1987 | Toops | 320/2 |
| 4,661,759 | 4/1987 | Klein | 320/21 X |
| 4,730,153 | 3/1988 | Breting et al. | |
| 4,736,150 | 4/1988 | Wagner | 320/21 |
| 4,878,007 | 10/1989 | Gabor et al. | |
| 4,947,124 | 8/1990 | Hauser | 320/48 X |
| 5,344,723 | 9/1994 | Bronoel et al. | 429/84 |
| 5,354,617 | 10/1994 | Ikkanzaka et al. | 428/397 |

FOREIGN PATENT DOCUMENTS

| | | |
|---|---|---|
| 0034000 | 8/1981 | European Pat. Off. |
| 0269783 | 6/1988 | European Pat. Off. |
| 3811371A1 | 10/1989 | Germany |

*Primary Examiner*—Robert Nappi
*Attorney, Agent, or Firm*—Frishauf, Holtz, Goodman, Langer & Chick

[57] ABSTRACT

In a method for charging a secondary battery having a positive electrode, a negative electrode, and an electrolyte, a pulsed current is supplied to the secondary battery to make the pulsed current flow between the positive electrode and the negative electrode through the electrolyte to thereby charge the secondary battery. The pulsed current comprises positive pulse current which has a positive pulse amplitude corresponding to a first current density of 1 $\mu A/cm^2$ to 100 $mA/cm^2$ in the positive electrode. However, the pulsed current may include a negative pulse current following after each positive pulse and having a negative amplitude corresponding to a second current density not greater than a quarter of the first current density.

5 Claims, 20 Drawing Sheets

5,614,805

METHOD AND APPARATUS FOR CHARGING A SECONDARY BATTERY BY SUPPLYING PULSED CURRENT AS CHARGING CURRENT

BACKGROUND OF THE INVENTION

The present invention relates to a method and an apparatus for charging a secondary battery.

Recently, electrical or electronic machines have been reduced in size and weight and have been made cordless, as electronics have developed. The secondary battery, for example, a lithium (Li) secondary battery, a nickel-cadmium (Ni—Cd) battery, and a nickel-zinc (Ni—Zn) battery, or the like, is known and used as a power source of such electrical or electronic machines. Under the circumstances, it is strongly desired that the secondary battery have a long cycle life so that the secondary battery can be repeatedly charged and discharged many times.

The secondary battery generally comprises, as is well known, a positive electrode, a negative electrode, and an electrolyte. The secondary battery is conventionally provided with a separator which separates the positive electrode and the negative electrode.

The secondary battery is conventionally charged by supplying an electric direct current (DC current). Accordingly, a conventional method for charging the secondary battery comprises the steps of producing a DC current, and supplying the DC current to the secondary battery to make the DC current flow from the positive electrode to the negative electrode through the electrolyte to thereby charge the secondary battery. Thus, it is cycled that the secondary battery is charged after being discharged, so that the secondary battery can be used for a long time.

It is known in the art that dendrite crystal grows on a surface of the negative electrode when the secondary battery is charged. The growth of the dendrite crystal is accelerated as the charging-discharging cycle is repeated many times. As a result, the grown dendrite crystal often breaks through the separator and comes into contact with the positive electrode, so that the positive electrode and the negative electrode are short-circuited. Eventually, the secondary battery becomes unusable. Thus, the growth of the dendrite crystal makes the cycle life of the secondary battery short.

In case of a Li secondary battery, the short circuit between the positive electrode and the negative electrode often causes a fire. Accordingly, the growth of the dendrite crystal unfortunately renders the Li secondary battery dangerous.

When Ni—Cd and Ni—Zn batteries are rapidly charged by use of large DC current, those batteries rise in temperature by the Joule's heat due to an internal resistance of those batteries. The temperature rise inevitably deteriorates a charge acceptability on the positive electrode. As a result, the Ni—Cd and the Ni—Zn batteries are reduced in capacity.

The Ni—Cd battery suffers from another particular problem, which is referred to as a "memory effect". Namely, the Ni-Cd battery memorizes a residual discharging capacity when charging starts. After completion of charging, the Ni-Cd battery stops discharging at the memorized residual discharging capacity. Consequently, a dischargeable capacity of the Ni—Cd battery is considerably deteriorated when charged before discharge is completed up to 100% of the discharging capacity.

It is unknown why the Ni—Cd battery suffers from the "memory effect". In order to protect the Ni—Cd battery from the "memory effect", charging of the Ni—Cd battery should strictly be restricted so that the Ni—Cd battery is charged only after the discharge has completely come up to 100%. Alternatively, a charging apparatus for use in charging the Ni—Cd battery is provided with a circuit which enables the Ni—Cd battery to be charged only after it has been discharged up to 100%.

SUMMARY OF THE INVENTION

It is therefore an object of this invention to provide a method of charging a secondary battery which enables the secondary battery to have a long cycle life.

It is another object of this invention to provide a method of the type described, which can prevent a Li secondary battery from catching fire.

It is still another object of this invention to provide a method of the type described, which can rapidly charge the secondary battery by use of large current.

It is further another object of this invention to provide a method of the type described, which can prevent a Ni—Cd battery from suffering from the "memory effect".

Other objects of this invention will become clear as the description proceeds.

According to an aspect of this invention, there is provided a method for charging a secondary battery which has a positive electrode, a negative electrode, and an electrolyte. The method comprises the steps of:

producing a pulsed current; and supplying the pulsed current to the secondary battery to make the pulsed current flow between the positive electrode and the negative electrode through the electrolyte to thereby charge the secondary battery.

According to another aspect of this invention, there is provided a charging apparatus for use in charging a secondary battery having a positive electrode, a negative electrode, and an electrolyte. The charging apparatus comprises:

DC power supply means for supplying a DC power with a constant current;

pulsed power generating means connected to the DC power supply means for generating a pulsed power from the DC power, the pulsed power being repeated with a controllable frequency, a controllable duty ratio, and a controllable waveform;

pulsed power control means connected to the pulsed power generating means for controlling the pulsed power to set the controllable frequency, the controllable duty ratio, and the controllable waveform into a predetermined frequency, a predetermined duty ratio, and a predetermined waveform; and output port means coupled to the pulsed power generating means and to be connected with the secondary battery for supplying the pulsed power to the secondary battery to make a pulsed current flow between the positive electrode and the negative electrode through the electrolyte to thereby charge the secondary battery.

DESCRIPTION OF THE PREFERRED EMBODIMENTS

A secondary battery to which the present invention is applied is a known one. Description is, however, at first made about the secondary battery for the better understanding of the present invention.

Figure 1:
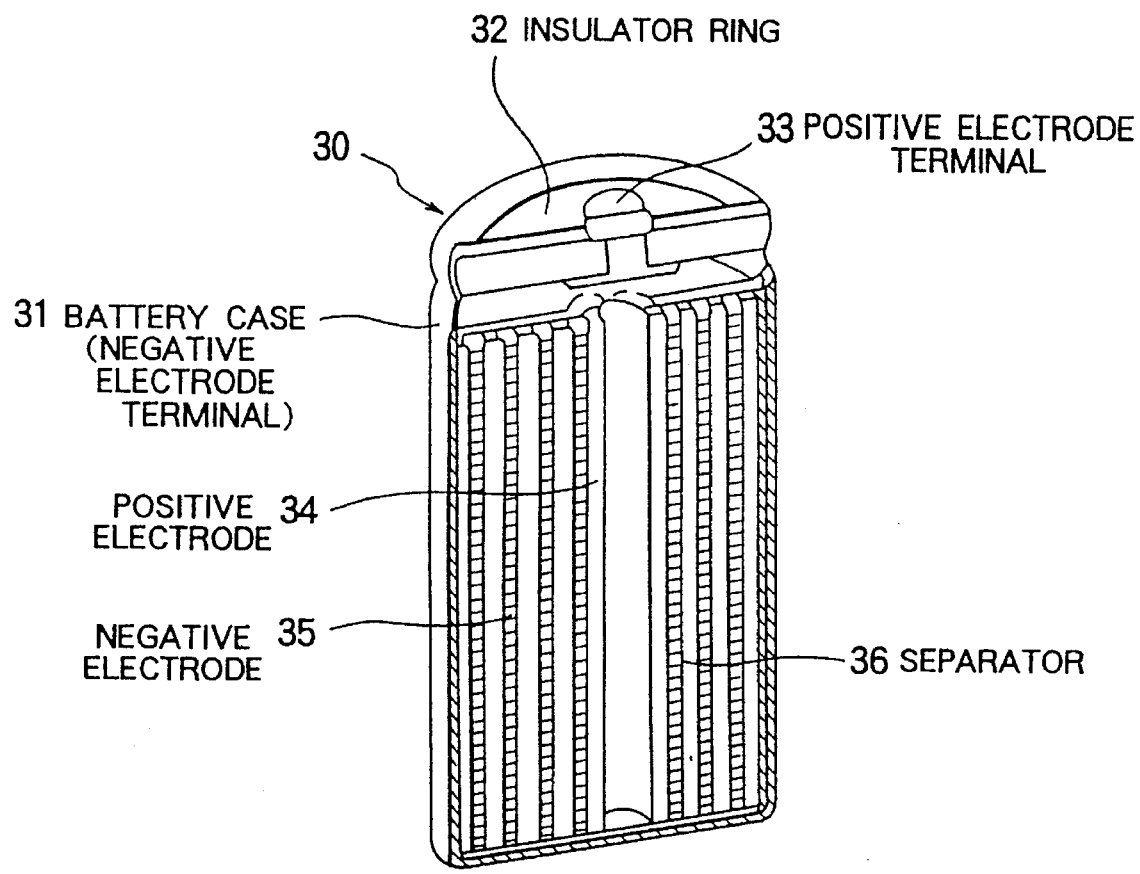
FIG. 1 is a schematic sectional view of a known Li secondary battery.

Referring to FIG. 1, a typical example of a lithium (Li) secondary battery 30 comprises a battery case 31 which is generally used as a negative electrode terminal, and an insulator ring 32 which is used as a cap of the battery case 31. A positive electrode terminal 33 is adapted to the insulator ring 32. A positive electrode 34, a negative electrode 35, and a separator 36 between the positive and the negative electrodes 34 and 35 are contained in the battery case 31. The separator 36 is impregnated with an electrolyte which is not shown in the figure. The positive and the negative electrodes 34 and 35 are connected to the positive electrode and the negative electrode terminals 33 and 31, respectively.

In the shown example, the battery case is used as the negative electrode terminal. However, there is known another type where the battery case is used as the positive electrode terminal with a negative electrode terminal being provided separate from the battery case. Further, the positive and the negative electrodes are shown wound together with the separator in spiral form in the figure, but another type is also known where they are concentrically disposed in the battery case.

In the conventional charging method, a positive DC voltage is applied across the positive and the negative electrode terminals 33 and 31 of the battery 30 to make a DC current flow from the positive electrode 34 to the negative electrode 35 through the electrolyte so as to charge the battery.

According to the present invention, a pulsed current is supplied to the battery so as to charge the battery.

Figure 2:
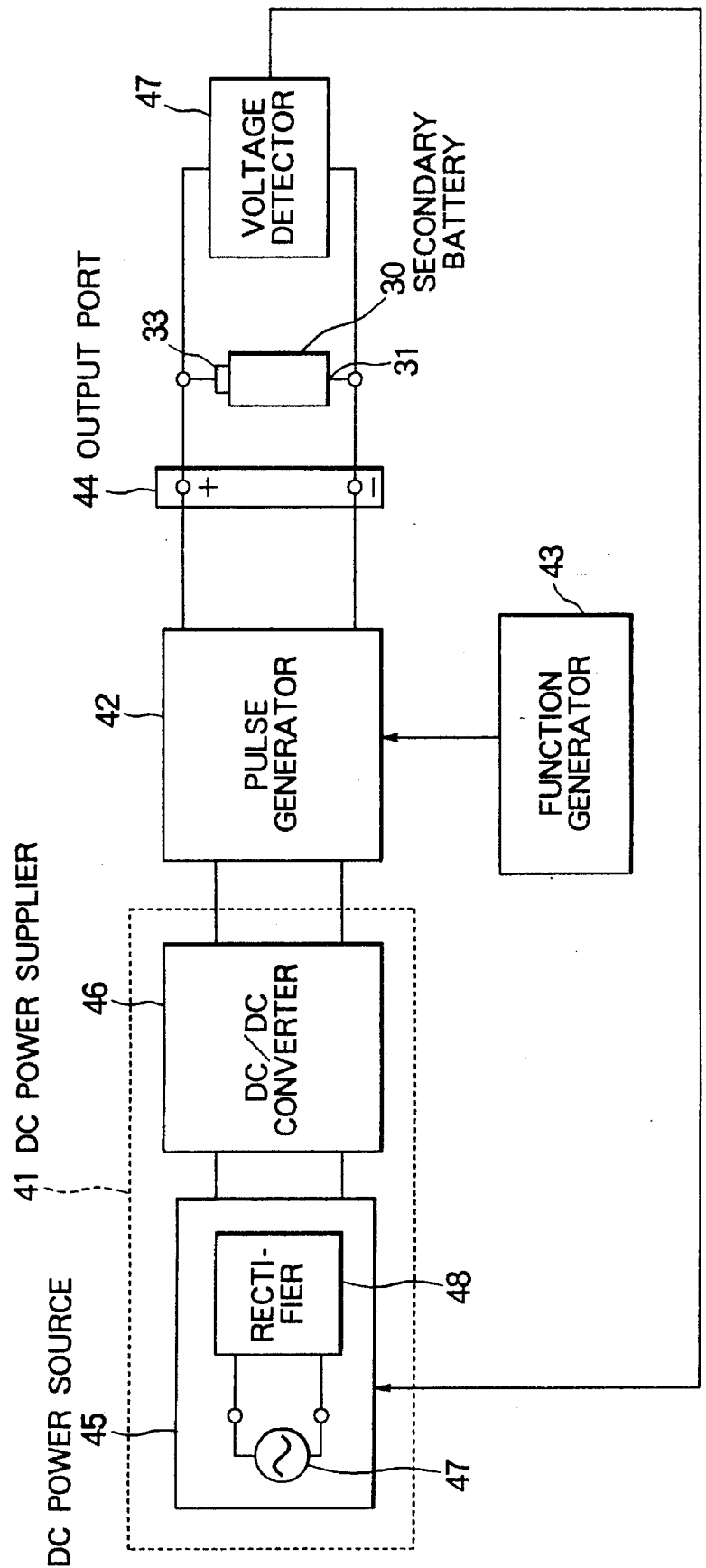
FIG. 2 is a block diagram of a charging apparatus according to the present invention.

Referring to FIG. 2, a charging apparatus according to an embodiment of the present invention comprises a DC power supplier 41, a pulse generator 42, a function generator 43, and an output port 44.

The DC power supplier 41 has a DC power source 45 and a DC/DC converter 46. The DC power source 45 includes an AC power source 47 such as a commercial AC power source and a rectifier 48 for rectifying the AC power to produce a rectified power. The DC/DC converter 46 regulates the rectified power to produce a regulated DC power with a constant current.

The pulse generator 42 is connected to the DC power supplier 41 and generates a pulsed power from the DC power. The pulsed power is repeated with a controllable frequency, a controllable duty ratio, and a controllable waveform.

The function generator 43 is connected to the pulse generator 42 and controls the pulsed power to set the controllable frequency, controllable duty ratio, and controllable waveform into a predetermined frequency, a predetermined duty ratio, and a predetermined waveform.

The output port 44 comprises a positive terminal (+) and a negative terminal (−) and is connected to the pulse generator 42. The output port 44 is used for charging a secondary battery therethrough.

In addition, the charging apparatus shown in the figure is further provided with a voltage detector 47 for detecting completion of charge where the secondary battery is completely charged up to 100%.

In use of the charging apparatus, the secondary battery 30 is connected to the output port 44 with the positive and the negative electrode terminals 38 and 31 being connected to the positive and the negative terminals of the output port 44. A power switch (not shown) is turned on at the DC power supplier 41. Then, the pulsed current is produced at the pulse generator 42 and is supplied to the secondary battery 30. Thus, the pulsed current flows from the positive electrode terminal 33 to the negative electrode terminal 31 of the secondary battery 30. Specifically, the pulsed current flows from the positive electrode 34 to the negative electrode 35 through the electrolyte in the secondary battery 30 to thereby charge the secondary battery.

Now, examples according to the present invention will be described below.

EXAMPLE 1

In order to estimate effects of the charging method of the present invention as to the cycle life characteristics of a lithium (Li) secondary battery, a charge-discharge cycle test was carried out for several samples of a Li secondary battery.

In the Li secondary battery, the positive electrode is made of a manganese dioxide, while the negative electrode is made of lithium metal. The electrolyte is such a solution that a $LiClO_4$ is melted in propylene carbonate (PC) with a concentration of 1N (normal).

In the charge-discharge cycle test, the charging operation was performed to charge each of the samples to a charged voltage of 3.5 V by use of the charging apparatus shown in FIG. 2. The pulsed current used for charging was differently adjusted for different samples to have different pulse repetition frequencies of 100 Hz, 10 kHz, and 0.1 Hz and a constant pulse duty ratio of 50%. Each pulse of the pulsed current was also adjusted to have a constant positive pulse amplitude sufficient to make a current of 0.1 mA flow per 1 $cm^2$ of the positive electrode of the battery. That is, the positive pulse amplitude is corresponding to a current density of 0.1 $mA/cm^2$ in the positive electrode of the battery. Thus, the maximum current density flowing through the positive electrode is 0.1 $mA/cm^2$.

For comparison, one of the samples was charged to 3.5 V by use of a DC current having a positive level corresponding to a current density of 0.1 $mA/cm^2$ in the positive electrode of the battery.

The discharge was performed by continuously supplying a current from the charged sample to a load at a rate of a current density of 0.1 $mA/cm^2$ in the positive electrode until the battery voltage became 2.0 V. A time period was measured for the voltage of each sample battery dropped from 3.5 V to 2.0 V. A supplying current was also measured when the supplying voltage became 2.0 V. A discharging capacity of each sample battery after each charging operation was calculated from the measured time period and the supplying current.

Figure 3:
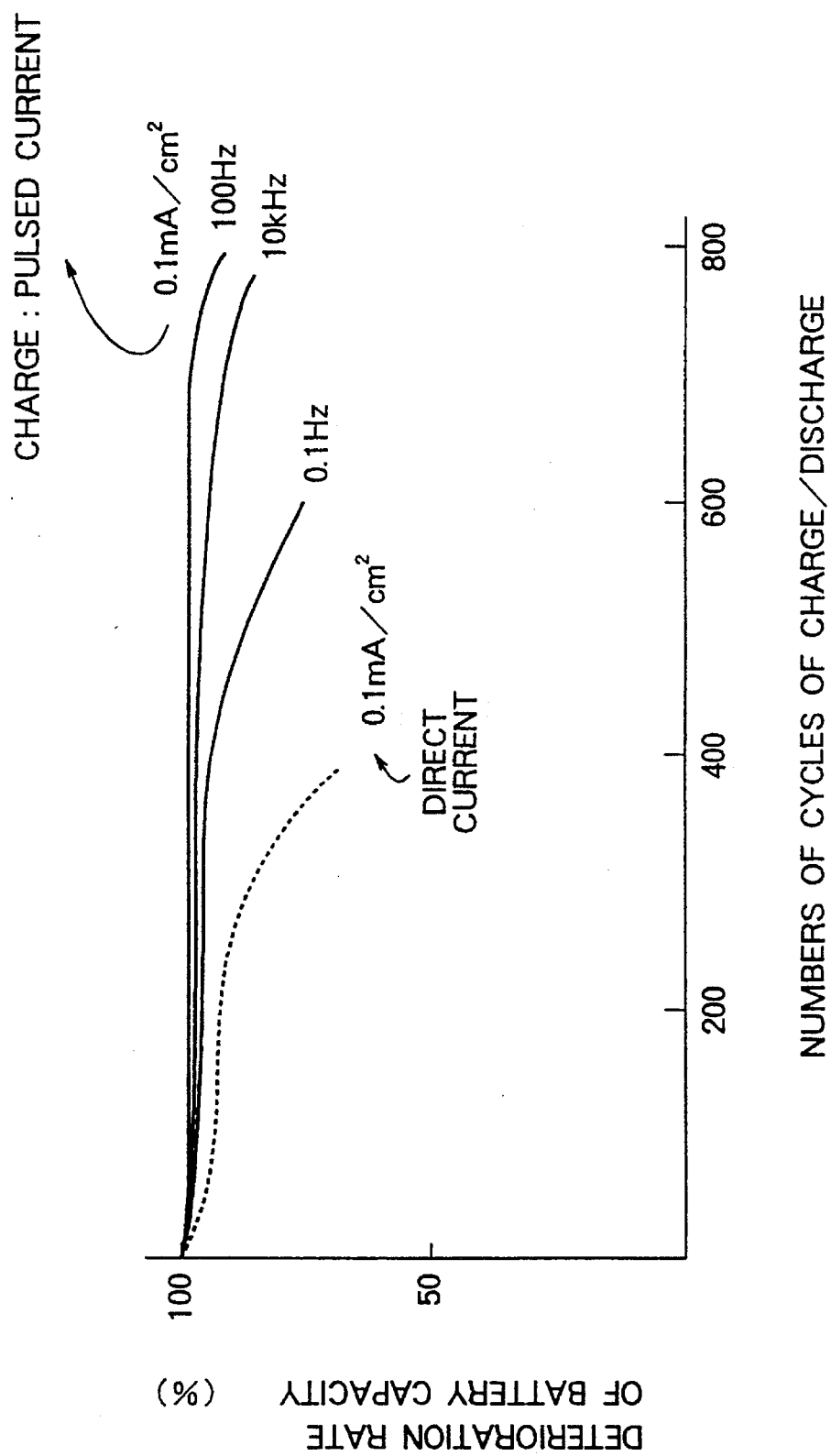
FIG. 3 is a graph for illustrating cycle life characteristics of a Li secondary battery charged by different pulsed currents according to a first example of this invention in comparison with a conventional charging method by use of DC current.

Providing that an initial discharging capacity after an initial charging operation is 100%, variation of the discharging capacity after each charging operation is shown in FIG. 3 as a relation between the number of the charge-discharge cycle and a deterioration rate of the battery discharging capacity.

It is noted from FIG. 3 that the samples charged by use of a pulsed current according to the present invention are considerably low in deterioration of battery discharging capacity in comparison with the sample charged by use of DC current according to the conventional charging method.

Figure 4A:
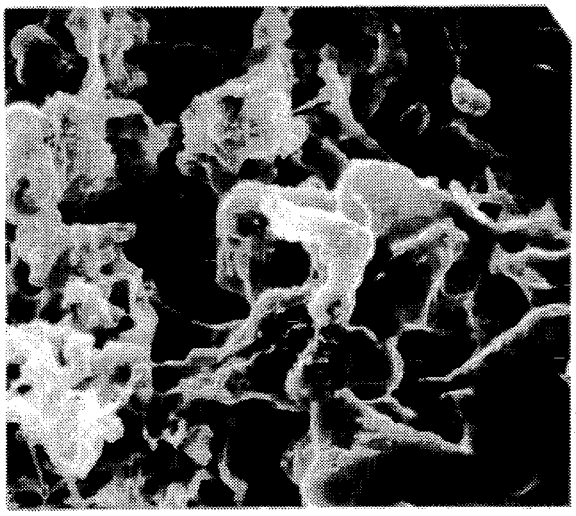
FIGS. 4(a) and 4(b), each show a couple of photos showing the microstructure of a surface of a negative electrode of a Li secondary battery, FIG. 4(a) being after charged by a pulsed current, and FIG. 4(b) being after charged by a DC current.
Figure 4B:
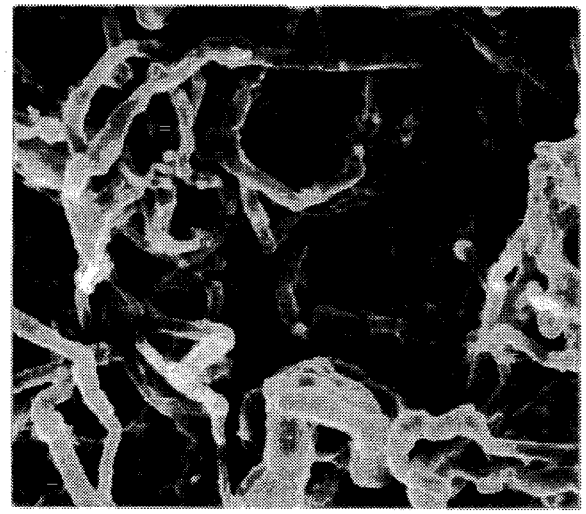

In order to seek the reason why the cycle life characteristics of the samples charged by the pulsed current are superior to those charged by the DC current, as suggested in FIG. 3, the microstructure of a surface of a negative electrode of each one of the samples was observed by use of a scanning electron microscope (SEM). FIG. 4(a) shows the SEM photo of the sample charged by the pulsed current with the pulse repetition frequency of 10 kHz and the pulse amplitude corresponding to the current density of 0.1 $mA/cm^2$. FIG. 4(b) shows that of the sample charged by the DC current corresponding to the current density of 0.1 $mA/cm^2$.

It is noted from FIGS. 4(a) and 4(b) that lithium has been deposited in the form of granules on the surface of the negative electrode of the sample charged by the pulsed current, while dendrite crystal has grown on the surface of the negative electrode of the sample charged by the DC current.

In view of results of the above charge-discharge cycle test and the SEM photos, it is readily understood that a growth of the dendrite crystal on a surface of a negative electrode causes a deterioration of cycle life characteristics and a short-circuit between a positive and a negative electrodes of a Li secondary battery.

Thus, the method according to the embodiment of the present invention can prevent cycle life characteristics of the Li secondary battery from being deteriorated and can prevent short circuits due to such a growth of the dendrite crystal.

EXAMPLE 2

From a different point of view, another charge-discharge cycle test was carried out for several samples of a Li secondary battery which are experimentally produced by use of the similar materials to those of the samples in Example 1.

In the charge-discharge cycle test, the charging operation was performed to charge each of the samples to a charged voltage of 3.5 V by use of the same charging apparatus as that used in Example 1. Each pulsed current used for charging was adjusted to have the constant pulse repetition frequency of 100 Hz and a pulse duty ratio of 50%. The pulse of the pulsed current was differently adjusted for different samples to have different positive pulse amplitudes which are corresponding to different current densities of 1 $\mu A/cm^2$, 0.1 $mA/cm^2$, 1 $mA/cm^2$, and 100 $mA/cm^2$ in the positive electrode of the battery.

For comparison, two of the samples were charged to 3.5 V by use of each DC current having different positive levels corresponding to current densities of 0.1 $mA/cm^2$ and 1 mA/cm², respectively, in the positive electrode of the battery.

Figure 5:
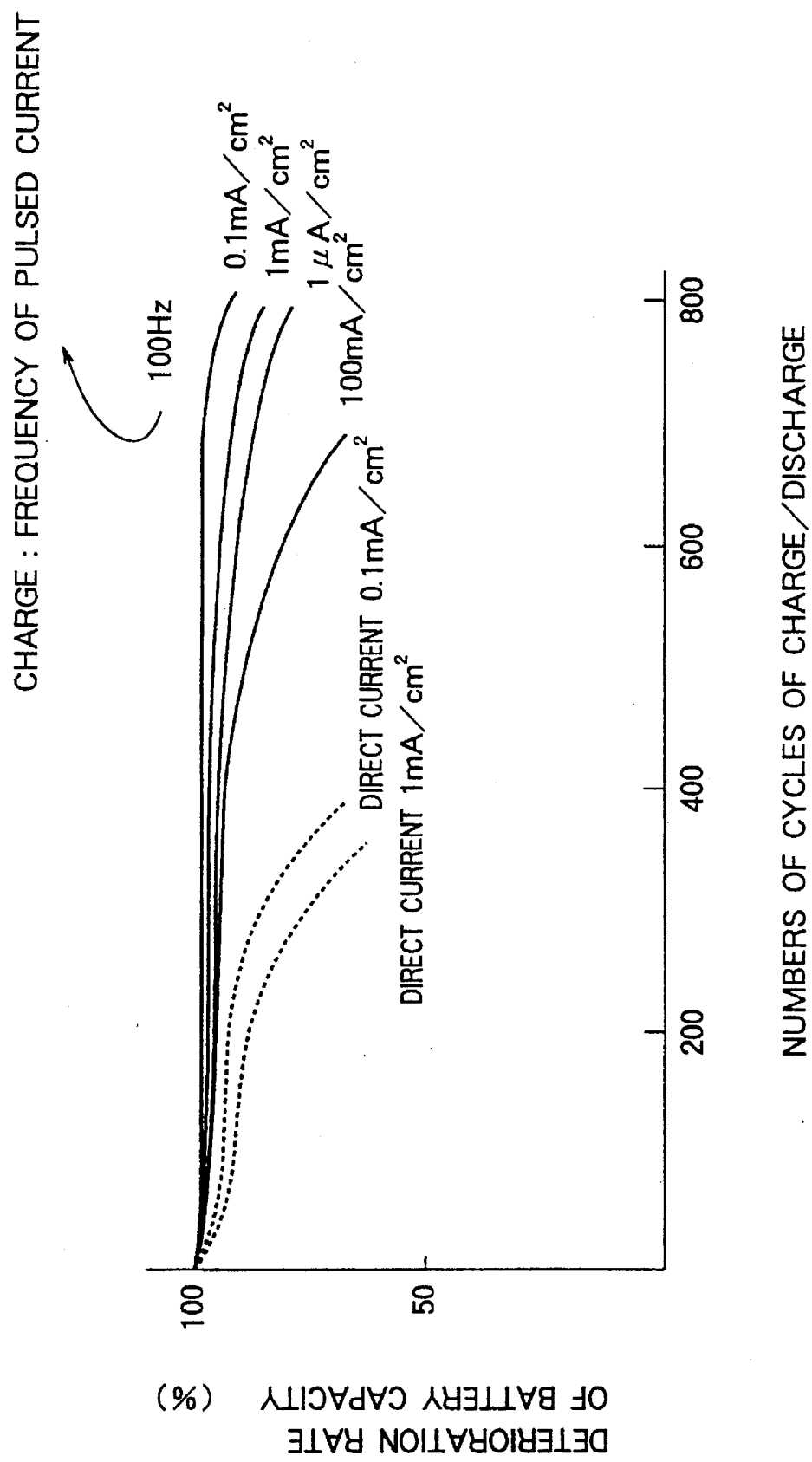
FIG. 5 is a graph illustrating cycle life characteristics of a Li secondary battery charged by use of different pulsed current according to a second example of this invention in comparison with a conventional charging method by use of DC current.

It is also noted from FIG. 5 that the samples charged by use of a pulsed current according to the present invention are considerably low in deterioration of battery discharging capacity in comparison with the sample charged by use of DC current according to the conventional charging method.

EXAMPLE 3

A further charge-discharge cycle test was carried out for several samples of a Li secondary battery which were experimentally produced by use of the similar materials to those of the samples in Examples 1 and 2.

The charge-discharge cycle test was carried out under the conditions described in Table 1.

Figure 6:
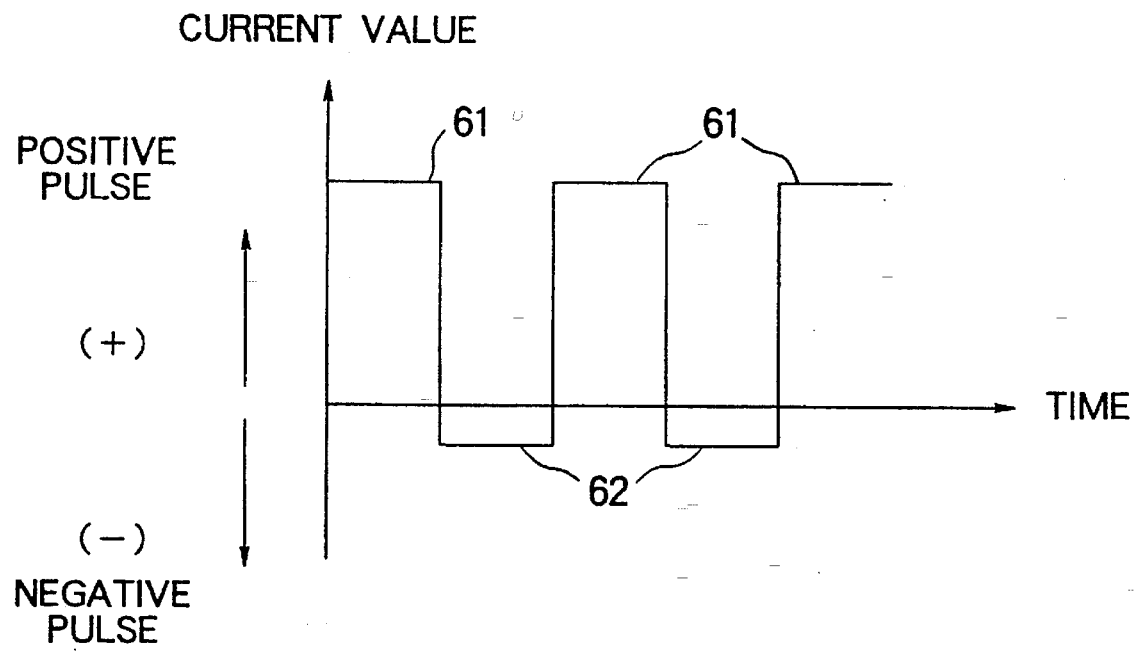
FIG. 6 shows a waveform of a pulsed current which is used in a method according to a third example of this invention.

Referring to FIG. 6, a pulsed current supplied to each of test samples shown in Table 1 comprises a positive pulse 61 and a negative pulse 62 following thereto which are repeated. The positive pulse 61 has a positive amplitude, while the negative pulse 62 has a negative amplitude.

For comparison, one of the samples was charged to 3.5 V by use of DC current having a positive level corresponding to a current density of 0.1 mA/cm² in the positive electrode of the battery.

Figure 7:
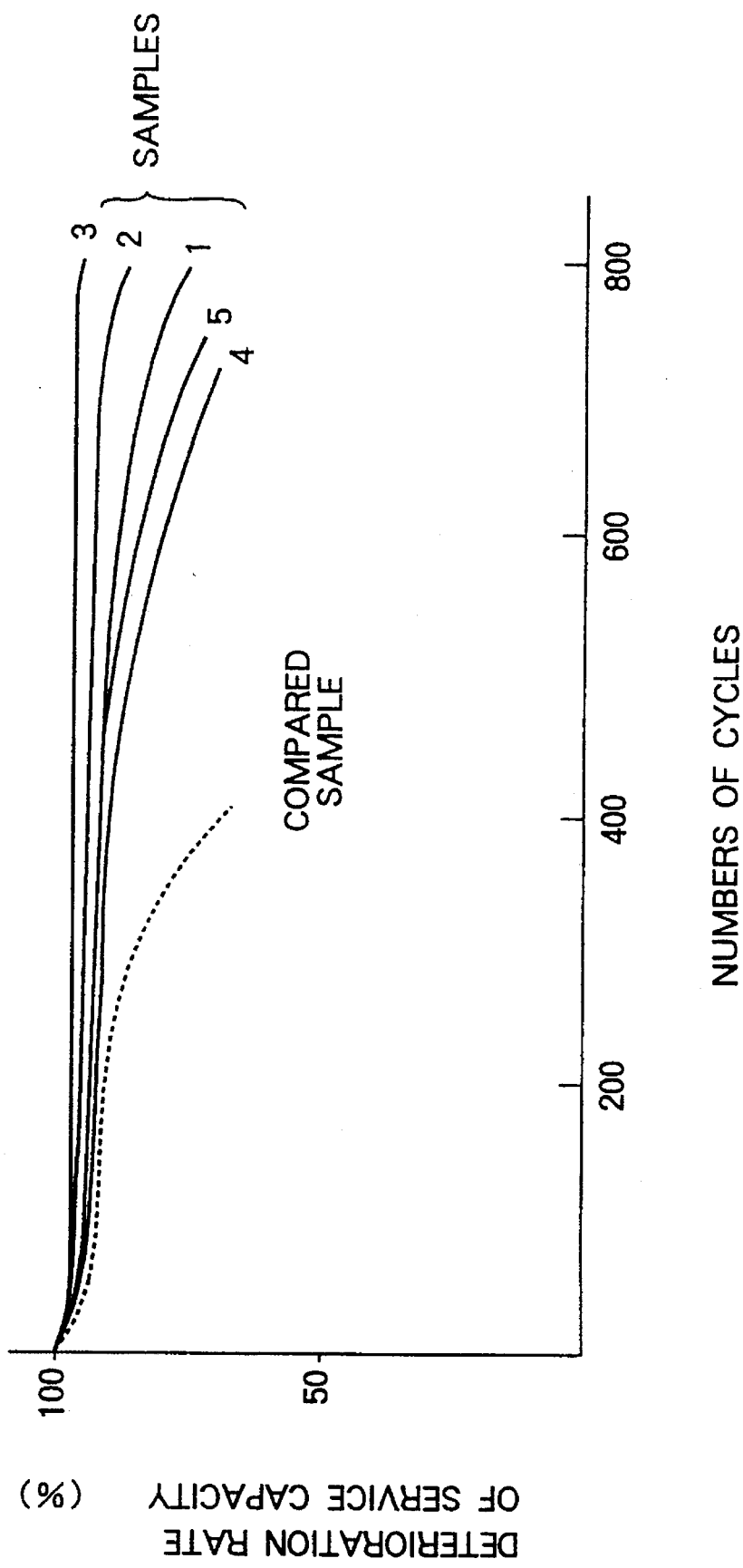
FIGS. 7 and 8 are graphs illustrating cycle life characteristics of a Li secondary battery charged according to the third example of this invention, the numbers labelling the curves corresponding to the test numbers in Table 1.
Figure 8:
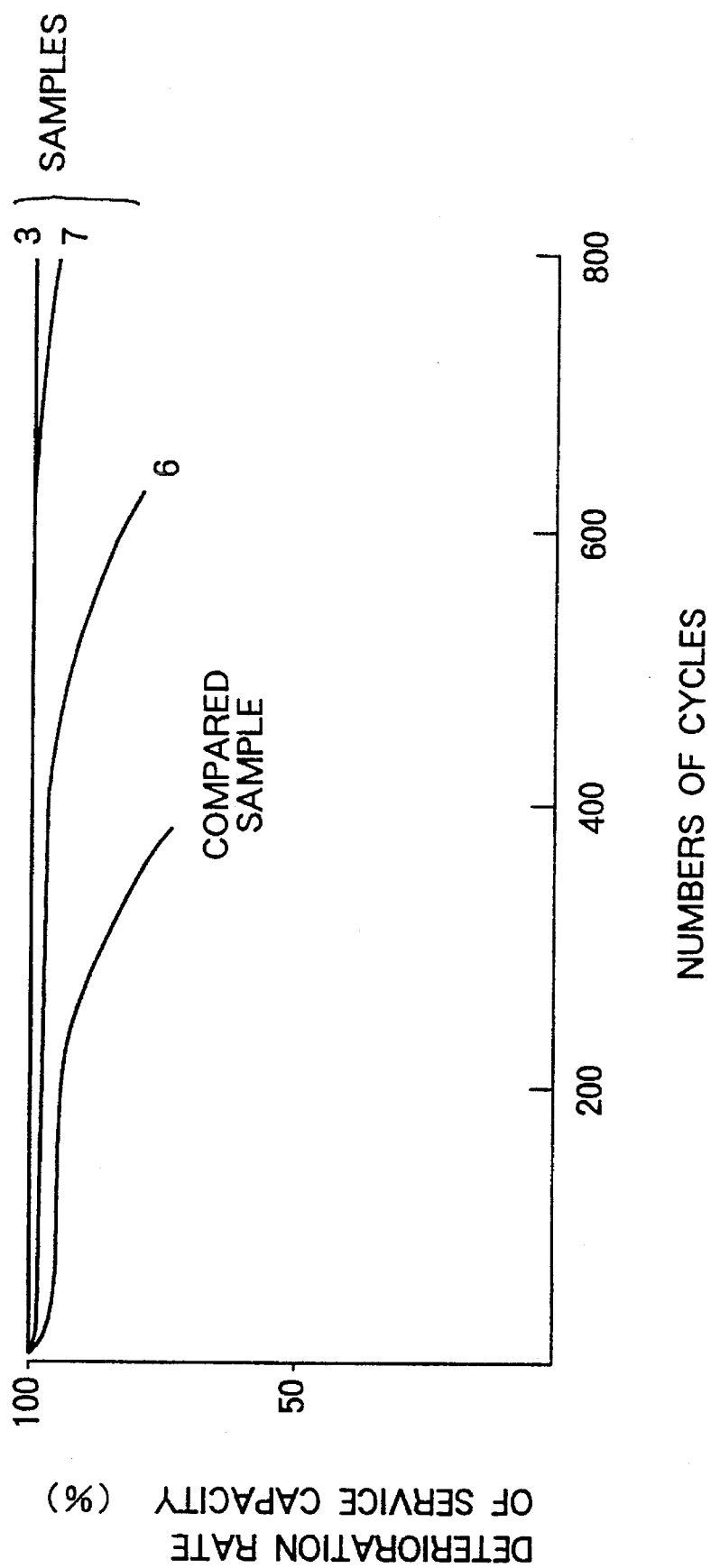

Results of the charge-discharge cycle tests are shown in FIGS. 7 and 8. FIG. 7 shows a result of test samples 1 to 5 which were charged by use of pulsed currents having the same pulse repetition frequency but different positive and negative pulse amplitudes. FIG. 8 shows a result of test samples 3, 6, and 7 which were charged by use of pulsed currents having different pulse repetition frequencies but the same positive and negative pulse amplitudes.

It is noted from FIGS. 7 and 8 that the samples charged by use of the pulsed current according to the present Example are very low in deterioration of battery discharging capacity in comparison with the sample charged by use of DC current according to the conventional charging method.

Preferably, the aforesaid second current density should not be greater than a quarter of the aforesaid first current density so as not to elongate a charging time period.

TABLE 1

| | CHARGING CONDITION (PULSED CURRENT) | | DISCHARGING CONDITION (DC CURRENT) |
| --- | --- | --- | --- |
| PULSE REPETI- | CURRENT VALUE/ $\mu Acm^{-2}$ | | |
| TION FREQU- ENCY/Hz | (+) CHARGING DIRECTION | (−) DISCHARGING DIRECTION | CURRENT VALUE/ $\mu Acm^{-2}$ DISCHARGE |
| TEST SAMPLE 1 | 100 | 1 | −0.25 | −100 |
| TEST SAMPLE 2 | 100 | 100 | −1 | −100 |
| TEST SAMPLE 3 | 100 | 100 | −10 | −100 |
| TEST SAMPLE 4 | 100 | $1 \times 10^5$ | −1 | −100 |
| TEST SAMPLE 5 | 100 | $1 \times 10^5$ | −10 | −100 |
| TEST SAMPLE 6 | 0.1 | 100 | −10 | −100 |
| TEST SAMPLE 7 | 10000 | 100 | −10 | −100 |
| COMPARED SAMPLE | 100 (DC CURRENT) | | | −100 |

DUTY RATIO: 50%
FINAL VOLTAGE: CHARGE 3.5 V, DISCHARGE 2.0 V

The positive amplitude was, as described in Table 1, corresponding to first current densities of 1 μA/cm² to 1×10⁵ μA/cm² (100 mA/cm²) in positive electrodes in the test samples 1 to 7. The negative amplitude was corresponding to second current densities of 0.25 μA/cm² to 10 μA/cm² which are less than the first current density, as described in Table 1.

As described in Table 1, the pulsed current used for charging each of the test samples 1 to 5 was adjusted to have a constant pulse repetition frequency of 100 Hz and a constant pulse duty ratio of 50%. The pulsed current used for charging test samples 6 and 7 was adjusted to have pulse repetition frequencies of 0.1 Hz and 10 kHz, respectively, and the constant pulse duty ratio of 50%.

The charging and the discharging operations were performed in the similar manner to that in Examples 1 and 2, as will be understood in Table 1.

EXAMPLE 4

Figure 9:
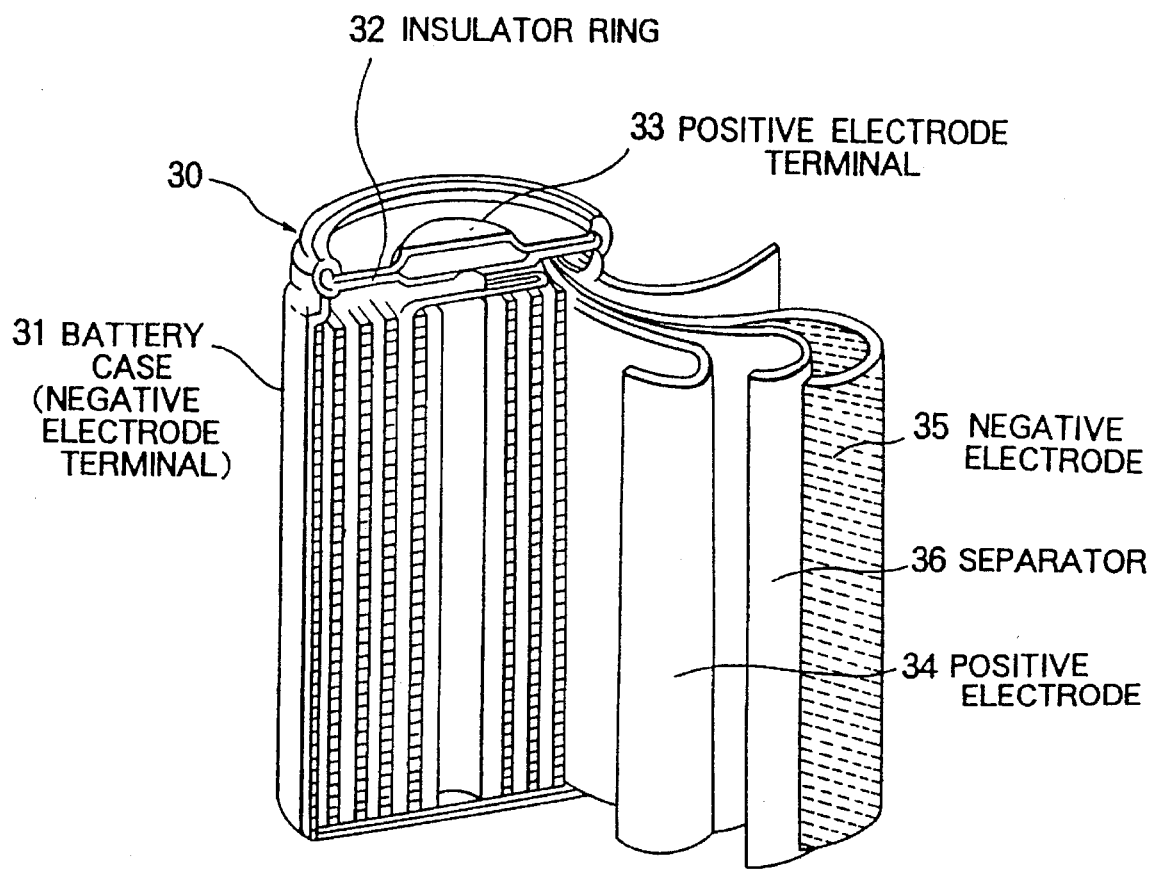
FIG. 9 is a schematic sectional view of a known Ni—Cd battery.

In this Example, ten samples of sealed Ni—Cd secondary battery were experimentally produced, one of which is illustrated in FIG. 9.

Since the illustrated sample of the Ni—Cd battery has a similar structure to the secondary battery illustrated in FIG. 1, description for the structure of the Ni—Cd battery is omitted. Similar portions are designated by like reference numerals.

In the Ni—Cd battery, the positive electrode 34 is made of sintered nickel consisting substantially of nickel hydroxide, while the negative electrode 35 is made of paste cadmium consisting substantially of cadmium hydroxide. The electrolyte is such a solution as consisting substantially of kalium hydroxide. The separator 36 is made of nylon nonwoven fabric cloth.

In order to estimate effect of the charging method of the present invention to the cycle life characteristics of the Ni—Cd secondary battery, a battery discharging capacity test as well as a charge-discharge cycle test were carried out for the samples of Ni—Cd secondary battery. In the tests, the pulsed current used for charging was adjusted for test samples 1 to 5 to be 180 mA and to have different pulse repetition frequencies of 1 Hz, 100 Hz, 5 kHz, 500 kHz, and 10 MHz with the same pulse duty ratio of 50%. Initially those test samples 1 to 5 were charged up to 100% of their charging capacity with a current of 180 mA at a temperature of 20° C. It was cycled fifty times that the test samples 1 to 5 were charged up to 100% each after discharged up to a depth of discharge of 50% (for two and a half hours).

The pulsed current used for charging was adjusted for test samples 6 to 8 to be 18 mA and to have different pulse repetition frequencies of 1 Hz, 5 kHz, and 10 MHz with the same pulse duty ratio of 50%. Initially, those test samples 6 to 8 were charged up to 100% of their charging capacity with a current of 18 mA at a temperature of 20° C. It was also cycled fifty times that test samples 6 to 8 were charged up to 100% each after discharged up to a depth of discharge of 50% (for two and a half hours).

For comparison, two of test samples 9 and 10 were charged by use of a DC current of 180 mA and 18 mA, respectively. It was also cycled fifty times that test samples 9 and 10 were charged up to 100% each after discharged up to a depth of discharge of 50% (for two and a half hours).

Results of the tests are shown in the following Table 2 and FIGS. 10 and 11.

In Table 2, there are shown an initial discharging capacity, discharging capacity after the above-mentioned cycle of fifty times, and a deterioration rate of the battery discharging capacity. In FIGS. 10 and 11, there are shown a relation of capacity deterioration rate of each sample in response to the numbers of the cycle.

Figure 10:
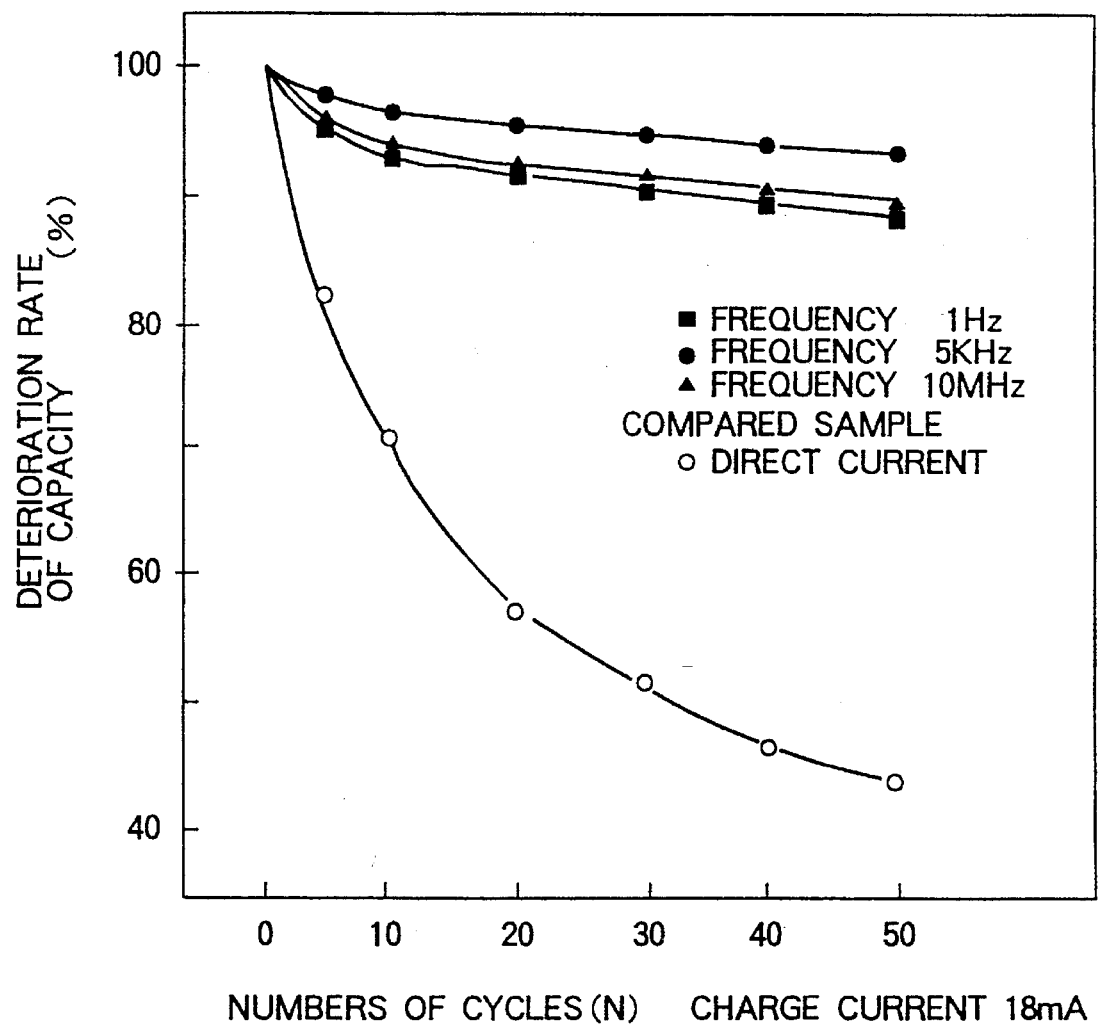
FIG. 10 is a graph illustrating cycle life characteristics of a Ni—Cd battery charged according to a fourth example of this invention, where the pulsed current is 18 mA, in comparison with a conventional charging method by use of DC current of 18 mA.
Figure 11:
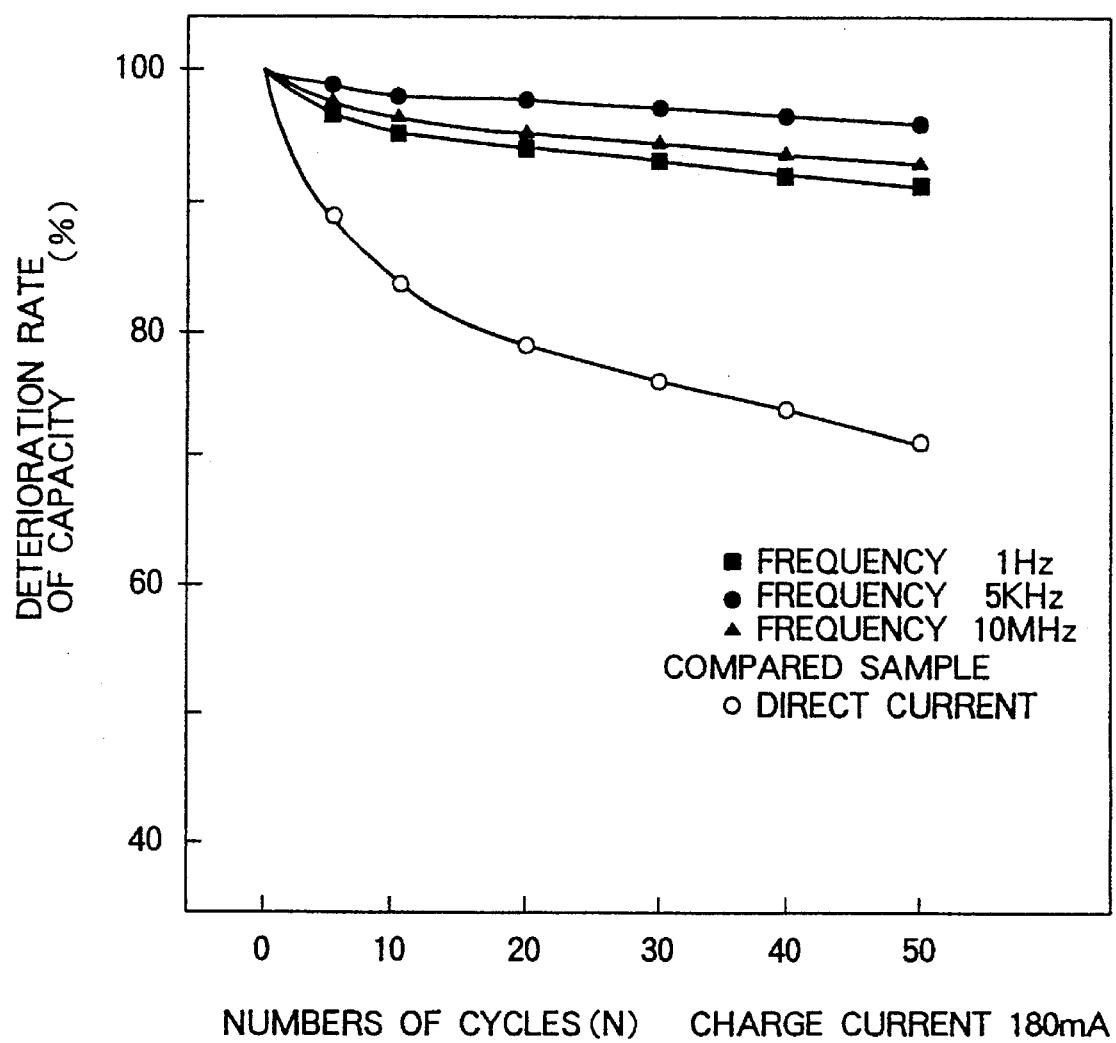
FIG. 11 is a graph illustrating cycle life characteristics of a Ni—Cd battery charged according to the fourth example of this invention where the pulsed current is 180 mA, in comparison with a conventional charging method by use of DC current of 180 mA.

It is noted from Table 2 and FIGS. 10 and 11 that the samples charged by use of a pulsed current according to the present Example are very low in deterioration of battery discharging capacity in comparison with the sample charged by use of DC current according to the conventional charging method.

EXAMPLE 5

In this Example, samples of sealed Ni—Cd secondary battery were produced, each of which was similar to that in Example 4.

From a different point of view, a battery discharging capacity test as well as a charge-discharge cycle test was carried out for the samples, as in Example 4.

In the tests, the pulsed current used for charging was adjusted for samples 1 to 4 to be 180 mA and to have a pulse repetition frequency of 5 kHz with different pulse duty ratios of 10%, 25%, 50%, and 75%, respectively.

In addition, the initial condition and the discharging condition are similar to those of Example 4.

Results of the tests are shown in the following Table 3.

TABLE 2

| | PULSED CURRENT CHARGING CONDITION | | | | | DETERIORATION RATE OF CAPACITY (%) |
|---|---|---|---|---|---|---|
| | PULSE REPETITION FREQUENCY (kHz) | DUTY RATIO (%) | CHARGE CURRENT (mA) | INITIAL CAPACITY (mAh) | CAPACITY AFTER 50 CYCLES (mAh) | |
| Test Sample 1 | 0.001 | 50 | 180 | 210 | 191 | 91.0 |
| Test Sample 2 | 0.1 | 50 | 180 | 202 | 195 | 96.5 |
| Test Sample 3 | 5 | 50 | 180 | 217 | 208 | 95.9 |
| Test Sample 4 | 500 | 50 | 180 | 203 | 195 | 96.1 |
| Test Sample 5 | 10000 | 50 | 180 | 197 | 182 | 92.4 |
| Test Sample 6 | 0.001 | 50 | 18 | 206 | 184 | 89.3 |
| Test Sample 7 | 5 | 50 | 18 | 200 | 188 | 94.0 |
| Test Sample 8 | 10000 | 50 | 18 | 209 | 188 | 90.0 |
| | CURRENT | | | | | |
| Test Sample 9 | DC CURRENT | | 180 | 215 | 152 | 70.7 |
| Test Sample 10 | DC CURRENT | | 18 | 213 | 93 | 43.7 |

TABLE 3

| | PULSED CURRENT CHARGING CONDITION | | | | CAPACITY | DETERIORA- |
|---|---|---|---|---|---|---|
| | PULSE REPETITION FREQUENCY (kHz) | DUTY RATIO (%) | CHARGE CURRENT (mA) | INITIAL CAPACITY (mAh) | AFTER 50 CYCLES (mAh) | TION RATE OF CAPACITY (%) |
| Test Sample 1 | 5 | 10 | 180 | 207 | 201 | 97.1 |
| Test Sample 2 | 5 | 25 | 180 | 211 | 203 | 96.2 |
| Test Sample 3 | 5 | 50 | 180 | 200 | 186 | 93.0 |
| Test Sample 4 | 5 | 75 | 80 | 204 | 185 | 90.7 |

It is noted from Table 3 that the samples charged by use of a pulsed current according to the present Example are very low in deterioration of battery discharging capacity, so that a pulse duty ratio is not related to the effect of the present invention.

EXAMPLE 6

In this Example, several samples of sealed Ni—Cd secondary battery were experimentally produced, which had similar structures to those in Example 4. Each separator of the samples in this Example had a thickness of 0.25 mm.

A comparison test for a discharging capacity as well as a charge-discharge cycle characteristic of the battery was carried out for the samples of Ni—Cd secondary battery.

In the test, the pulsed current used for charging was adjusted to be 18 mA to 720 mA for different samples and to have a constant pulse repetition frequency of 500 Hz with a constant pulse duty ratio of 50%.

It was cycled ten times that the samples were discharged up to 100% with a current of 36 mA after charged up to 100% with the pulsed current of 18 mA to 720 mA, respectively.

For comparison, the samples were charged by use of different DC current of 18 mA to about 200 mA. It was also cycled ten times on the same condition as the above.

Figure 12:
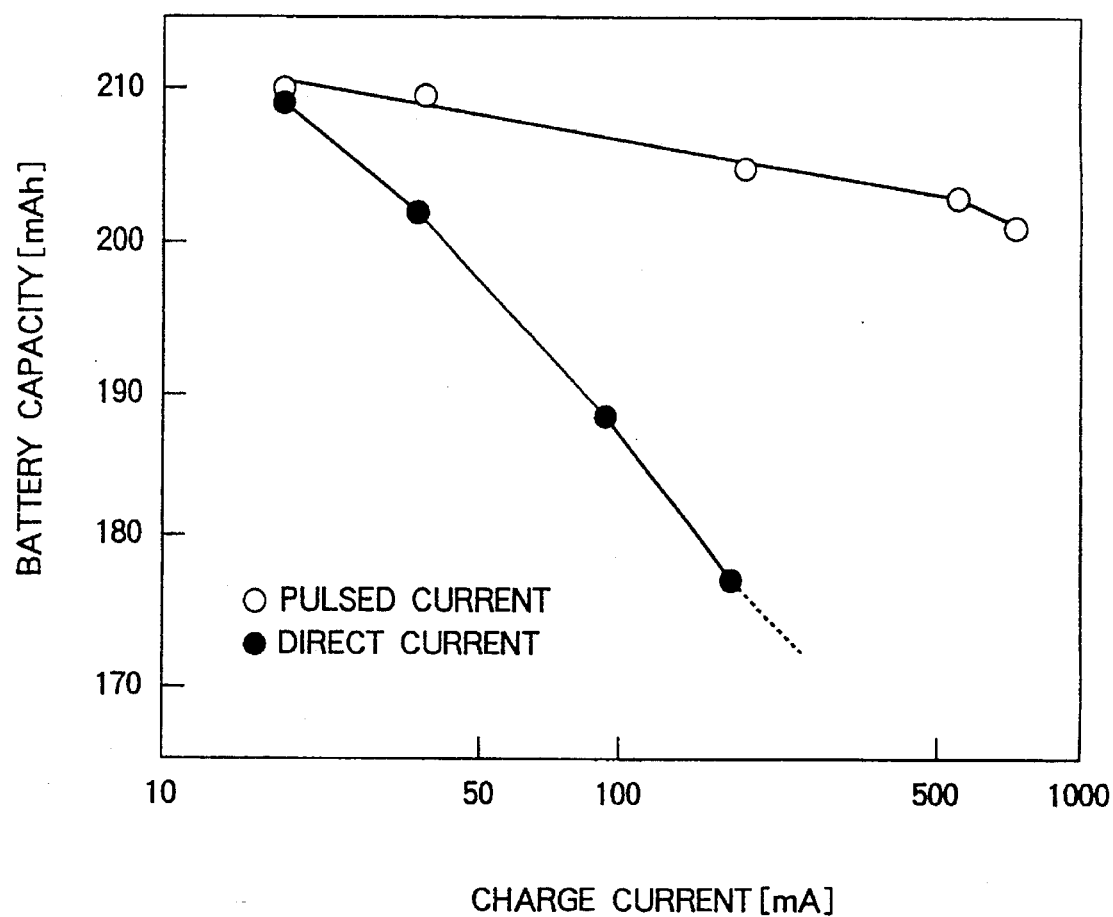
FIG. 12 is a graph illustrating a relation of capacity of each Ni—Cd battery in response to an amount of charged current according to a sixth example of this invention in comparison with a conventional charging method by use of DC current of 180 mA.

A result of the test is shown in FIG. 12 by illustrating a relation of capacity of the samples in response to the charge current.

It is noted from FIG. 12 that the capacity of the samples charged by a pulsed current according to the method of the present invention are kept stable, even though the charge current increases. However, samples charged by use of a DC current according to the conventional method are considerably deteriorated in the capacity, as the charge current increases.

EXAMPLE 7

In this Example, several samples of sealed Ni—Cd secondary battery were experimentally produced, which had the similar structures to those in Example 6.

As in Example 6, a comparison test was carried out with conditions similar to those in Example 6, except that the pulsed current used for charging was adjusted to be 36 mA, 180 mA, and 540 mA for different samples 1 to 3 and that the DC current was adjusted to be 18 mA, 36 mA, and 180 mA for different samples 4 to 6.

Figure 13:
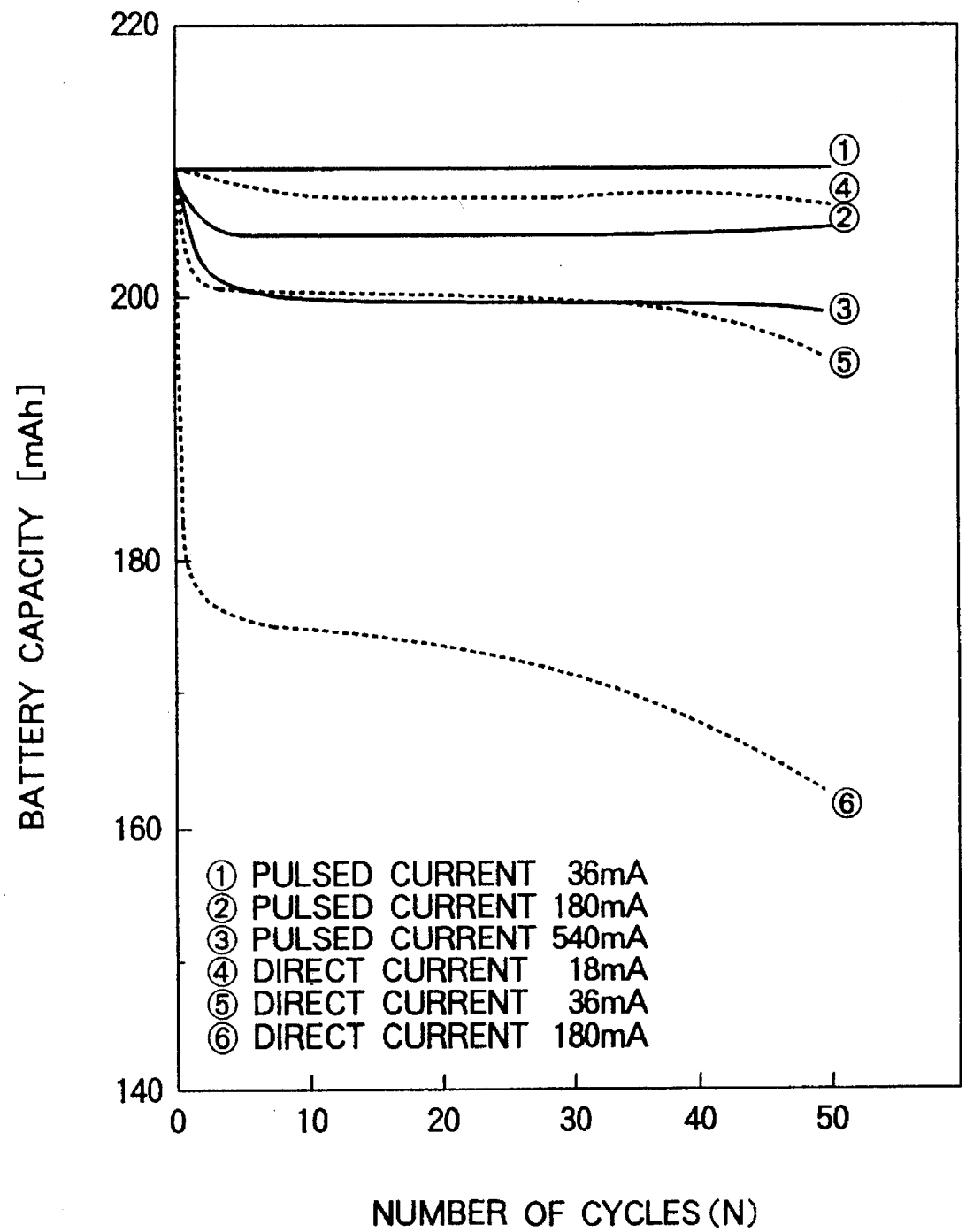
FIG. 13 is a graph illustrating a relation of the capacity of each Ni—Cd battery in response to the number of cycles according to a seventh example of this invention, in comparison with a conventional charging method by use of DC current of 180 mA.

A result of the test is shown in FIG. 13 by illustrating a relation of capacity of the samples in response to the numbers of the cycle.

It is noted from FIG. 13 that the capacity of the samples charged by a pulsed current according to the method of the present invention are kept stable even though the charge current becomes large in comparison with the ones charged by use of a DC current according to the conventional method. It is also noted from FIG. 13 that the capacity of the samples charged by a pulsed current according to the method of the present invention are kept stable even though the numbers of cycles increases.

Figure 14:
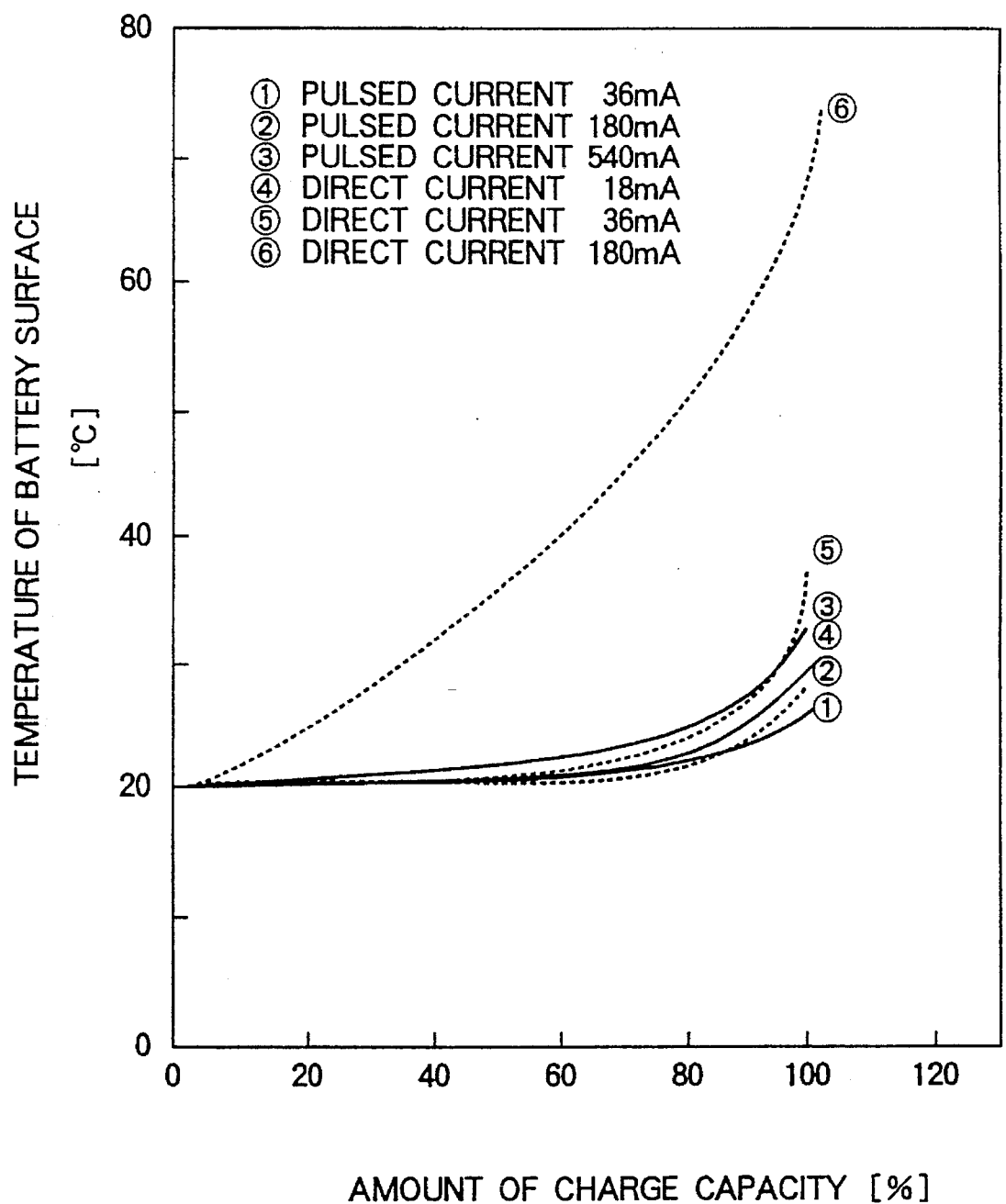
FIG. 14 is a graph illustrating a relation of a temperature of a surface of the Ni—Cd battery in response to a charge capacity according to the seventh example of this invention, in comparison with a conventional charging method by use of DC current of 180 mA.

Further, another result of the test is shown in FIG. 14 by illustrating a relation of a temperature of a battery surface in response to the charge current.

It is noted from FIG. 14 that the temperature of the battery surface of the samples 1 to 3 charged by a pulsed current according to the method of the present invention are kept stable, even though the charge current increases. However, the temperature of the battery surface of the samples 4 to 6 charged by use of a DC current according to the conventional method rises, particularly in the sample 6, as the charge current increases.

Thus, according to the method of the present invention, the Ni—Cd secondary battery can be rapidly charged by use of large current. Furthermore, if charged by use of such a large current, the Ni—Cd secondary battery can be prevented from temperature rise, so that it is not reduced in capacity.

EXAMPLE 8

In this Example, first, a sample of a sealed Ni—Cd secondary battery was produced, which had the thickness of the separator of 0.25 mm similar to that of the Example 7.

Second, several samples of the Ni—Cd secondary battery were experimentally produced which had different separators of 0.225 mm, 0.2 mm, and 0.175 mm in thickness. The volume of the positive electrode of each sample was increased in correspondence to the decrease in thickness of each separator.

A battery capacity test was carried out for each sample mentioned above.

In the test, the pulsed current used for charging was adjusted to be 36 mA and to have a pulse repetition frequency of 500 Hz with a pulse duty ratio of 50%. The samples were discharged up to 100% with a current of 36 mA after charged up to 100% with the above pulsed current.

Figure 15:
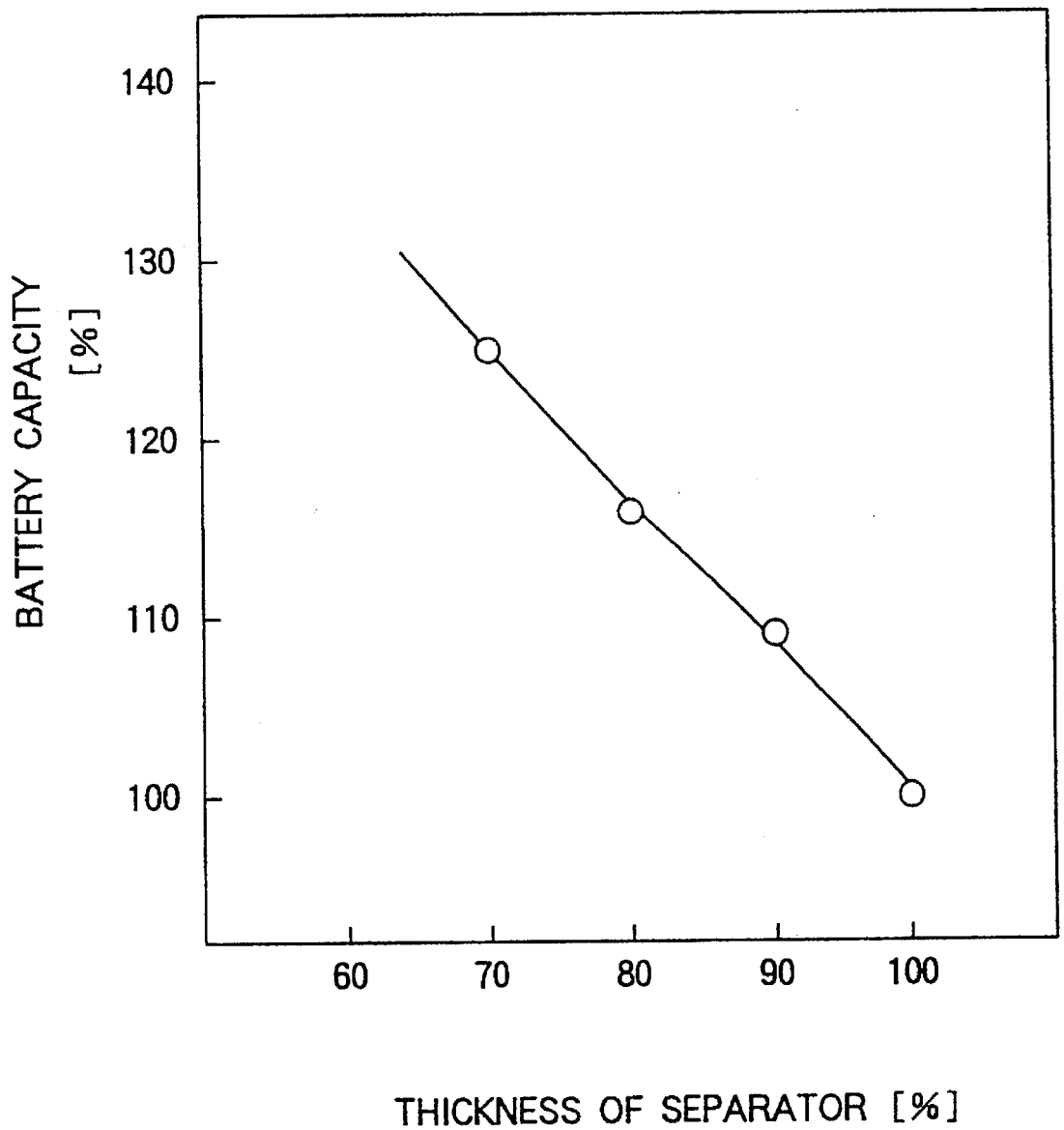
FIG. 15 is a graph illustrating a relation of capacity of a Ni—Cd battery in response to a thickness of the separator according to an eighth example of this invention.

A result of the test is shown in FIG. 15 by illustrating a relation of capacity of each sample in response to a thickness of the separator of each sample.

It is noted from FIG. 15 that the capacity of the each sample is increased corresponding to the decrease in thickness of the separator of each sample.

EXAMPLE 9

In this Example, two samples of sealed Ni—Cd secondary battery were produced in the manner similar to that of Example 6, one of which had a thickness of the separator of 0.175 mm, and another of which had a thickness of 0.25 mm.

A battery capacity test was carried out for the two samples by measuring a discharge after charged by a pulsed current of the conditions similar to those of the Example 8.

Figure 16:
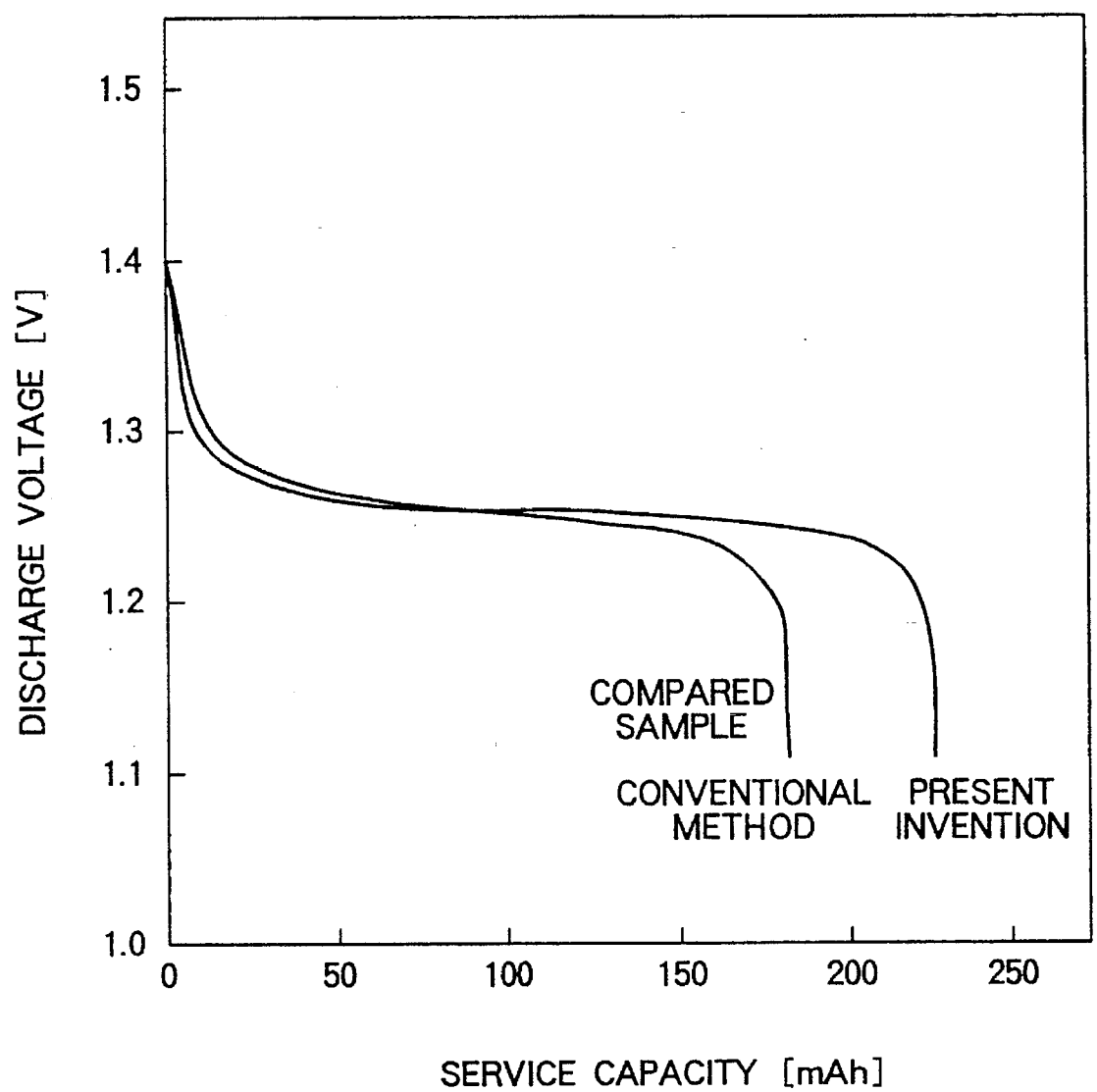
FIG. 16 is a graph illustrating a relation of discharge voltage in response to a service capacity of a Ni—Cd battery according to a ninth example, in comparison with a conventional charging method by use of DC current of 180 mA.

A result of the test is shown in FIG. 16 by illustrating a relation of discharge voltage of each sample in response to discharging capacity.

It is noted from FIG. 16 that the discharging capacity of the Ni—Cd secondary battery is increased when a separator of the Ni—Cd secondary battery is decreased in thickness.

EXAMPLE 10

In this Example, two samples of sealed Ni—Cd secondary battery were produced in similar manner to that of Example 6, both of which had a thickness of the separator of 0.175 mm.

A battery capacity test was carried out for the two samples. In the test, it was cycled that one of the test samples was discharged up to 100% with a current of 36 mA after charged up to 100% by a pulsed current adjusted to be 36 mA and to have a pulse repetition frequency of 500 Hz with a pulse duty ratio of 50%. It was also cycled that another one of the test samples was discharged up to 100% with a current of 18 mA after charged up to 100% by a DC current adjusted to be 18 mA.

Figure 17:
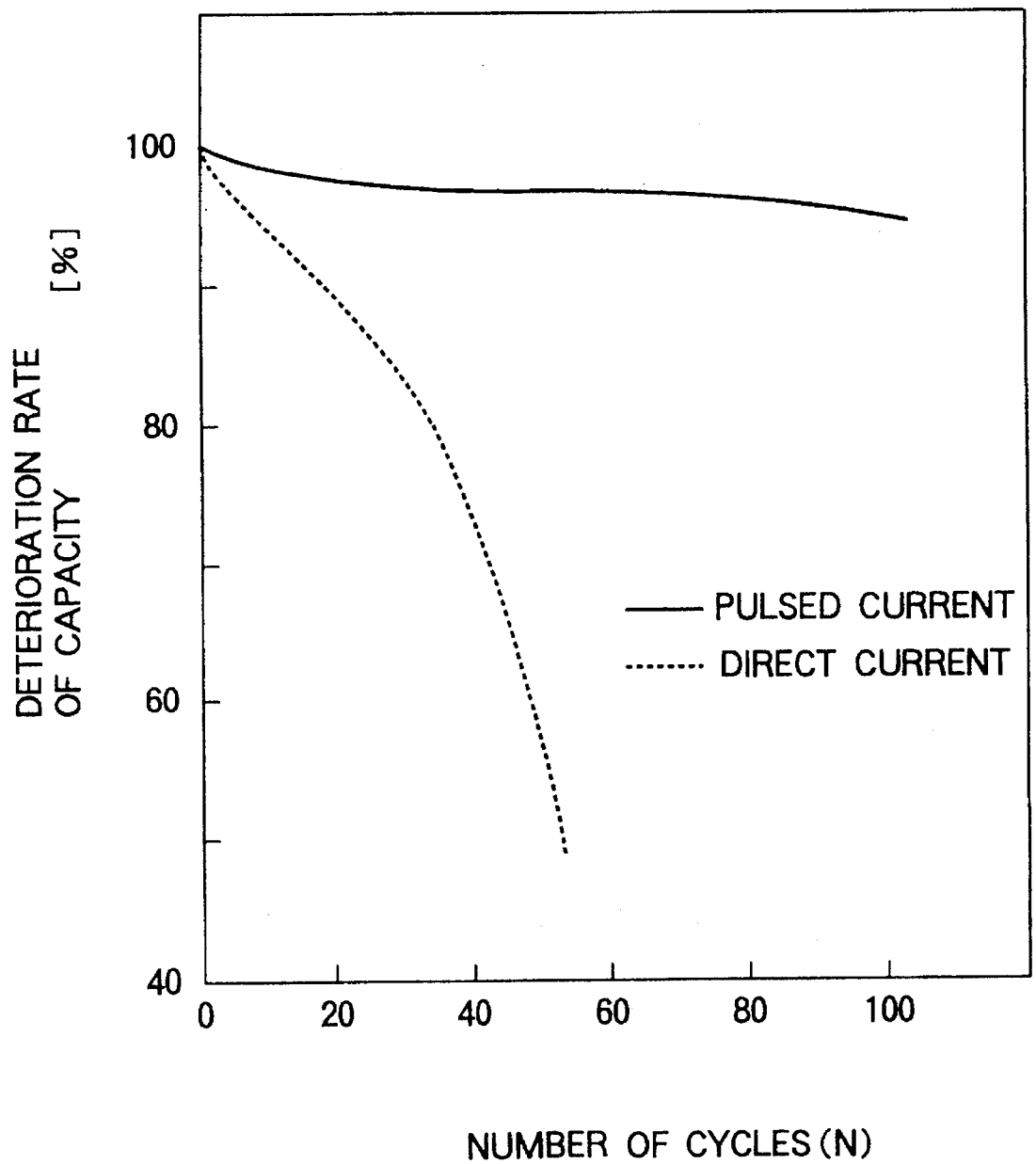
FIG. 17 is a graph illustrating a relation of capacity deterioration rate of a Ni—Cd battery in response to the number of cycles according to a tenth example in comparison with a conventional charging method by use of DC current of 180 mA.

A result of the test is shown in FIG. 17 by illustrating a relation of deterioration rate of capacity of each sample in response to the number of the cycles.

It is noted from FIG. 17 that a cycle life characteristic of the Ni—Cd battery is not so deteriorated even though a separator of the Ni—Cd battery has a decreased thickness of 0.175 mm, when the Ni—Cd battery is charged by a pulsed current according to the method of the present invention. In comparison with this, it is deteriorated in charging by use of DC current.

Thus, according to the method of the present invention, there can be provided a Ni—Cd secondary battery which has a separator having a thickness not greater than 0.25 mm. Accordingly, a Ni—Cd secondary battery with a large capacity and a long cycle life is able to be provided.

EXAMPLE 11

In this Example, several samples of sealed Ni—Zn secondary battery were experimentally produced.

Since the samples of Ni—Zn battery have similar structures to the secondary battery illustrated in FIG. 1, description for the structure of the Ni—Zn battery is omitted.

In the Ni—Zn battery, the positive electrode is made of sintered nickel consisting substantially of nickel hydroxide, while the negative electrode is made of zinc. The electrolyte is such a solution as consisting substantially of kalium hydroxide.

In order to estimate effect of the charging method of the present invention to the cycle life characteristic of the Ni—Zn secondary battery, a battery discharging capacity test as well as a charge-discharge cycle test were carried out for the samples of Ni—Zn secondary battery.

In the tests, the pulsed current used for charging was differently adjusted for different test samples 1 to 4 to have different pulse repetition frequencies of 1 Hz, 100 Hz, 10 kHz, and 10 MHz with a constant pulse duty ratio of 50%.

It was cycled that the test samples 1 to 4 were discharged up to 100% with a current of 200 mA each after charged up to 100% with the above-mentioned pulsed current of 80 mA.

For comparison, another test sample 5 was charged by use of a DC current of 80 mA. It was also cycled that test sample 5 was discharged up to 100% with a current of 200 mA after charged up to 100% with the DC current of 80 mA.

Figure 18:
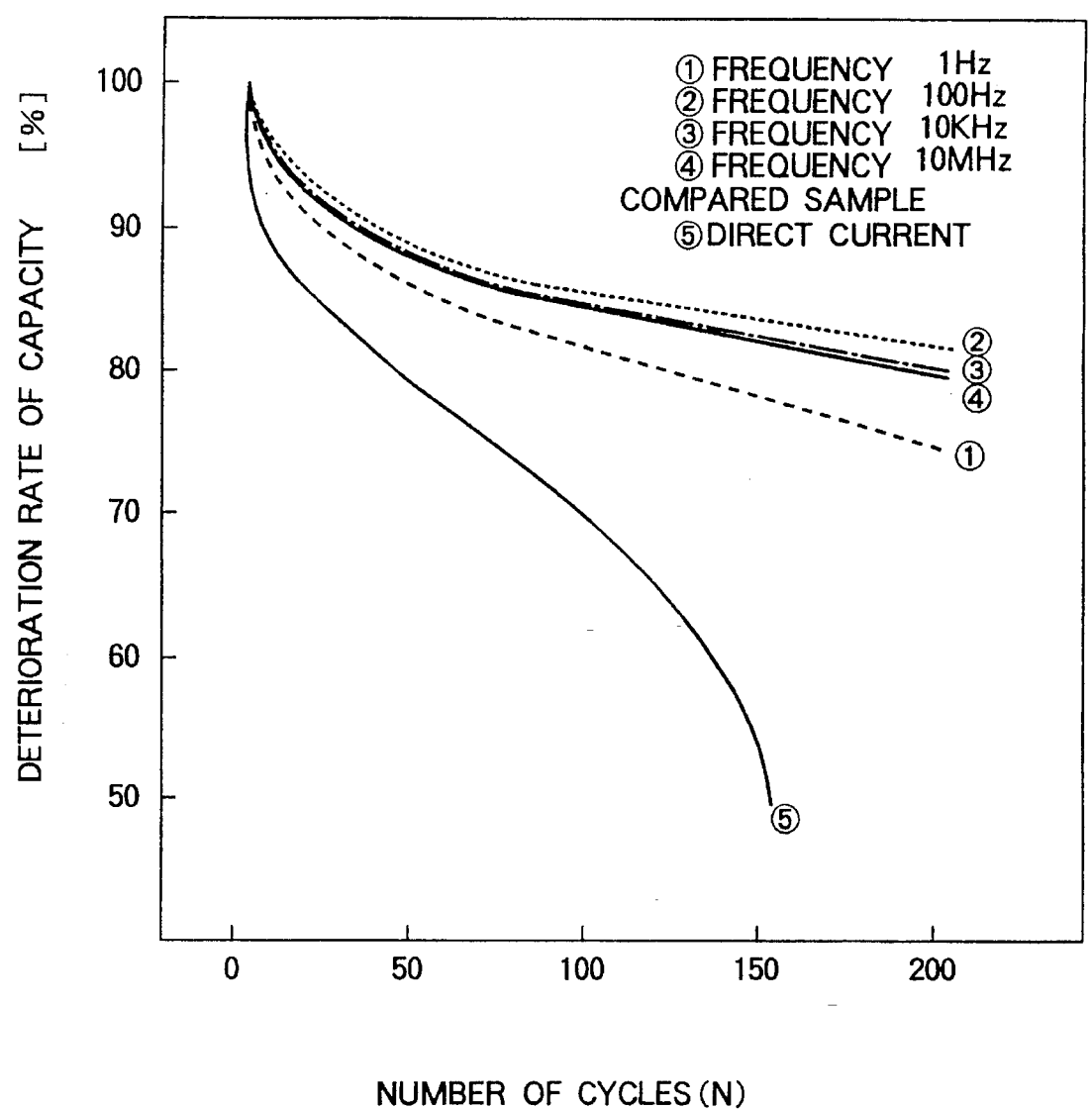
FIG. 18 is a graph illustrating a relation of capacity deterioration rate of a Ni—Zn battery in response to the numbers of the cycle according to an eleventh example, in comparison with a conventional charging method by use of DC current of 180 mA.

A result of the test is shown in FIG. 18 by illustrating a relation of deterioration rate of capacity of each sample in response to the number of cycles.

It is noted from FIG. 18 that a cycle life characteristic of test samples 1 to 4 is not so deteriorated even though the number of cycles increases. However, a cycle life characteristic of test sample 5 is drastically deteriorated, as the number of cycles increases.

EXAMPLE 12

In this Example, several samples of sealed Ni—Zn secondary battery were experimentally produced, which had similar structures to those in Example 11.

A comparison test for a discharging capacity as well as a charge-discharge cycle characteristic of the battery was carried out for the samples of Ni—Zn secondary battery.

In the test, the pulsed current used for charging was differently adjusted for different samples to be 40 mA, 80 mA, 160 mA, and 320 mA and to have a constant pulse repetition frequency of 50 Hz with a constant pulse duty ratio of 50%.

It was cycled that the samples were discharged up to 100% with a current of 200 mA after charged up to 100% with the pulsed current of 40 mA, 80 mA, 160 mA, and 320 mA, respectively.

For comparison, the samples were charged by use of DC current differently adjusted for different samples to be 40 mA, 80 mA, and 160 mA. It was also cycled that the samples were discharged up to 100% with a current of 200 mA after charged up to 100% with the DC current of 40 mA, 80 mA, and 160 mA, respectively.

Figure 19:
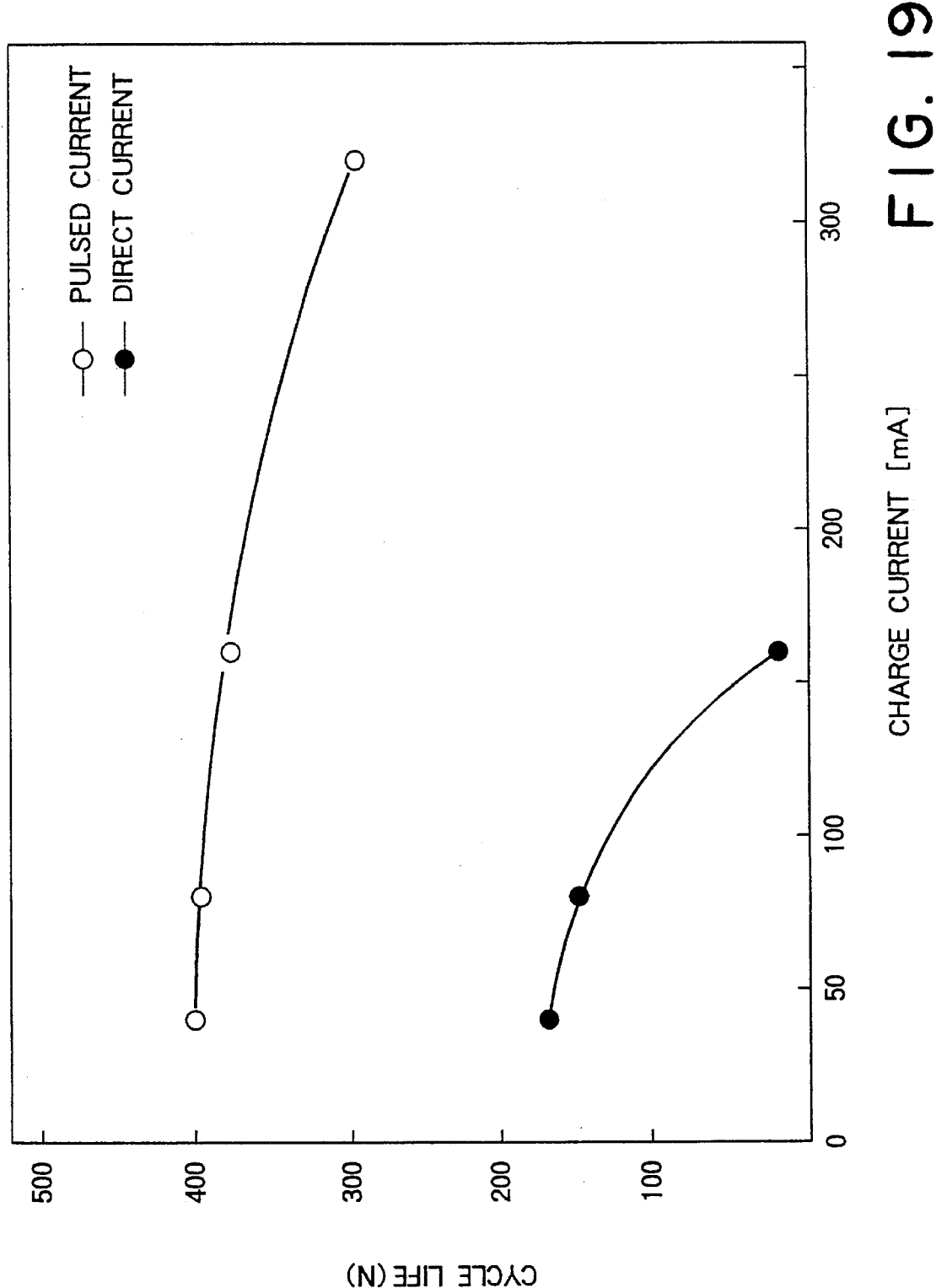
FIG. 19 is a graph illustrating a relation of the cycle life number in response to an amount of charge current of a Ni—Zn battery according to a twelfth example, in comparison with a conventional charging method by use of DC current of 180 mA.

A result of the test is shown in FIG. 19 by illustrating a relation of numbers of the cycles in the samples in response to the charge current.

It is noted from FIG. 19 that the cycle life characteristics of the samples charged by the pulsed current according to the method of the present invention are not so deteriorated, even though the charge current increases. However, samples charged by use of the DC current according to the conventional method are considerably deteriorated in the cycle life characteristics, as the charge current increases.

It is also noted from FIG. 19 that the cycle life characteristics of the samples charged by the pulsed current are not so deteriorated, even though a large charge current, is supplied such as 160 mA or 320 mA, so that a Ni—Zn secondary battery can be rapidly charged according to the method of the present invention.

EXAMPLE 13

In this Example, two samples of sealed Ni—Zn secondary battery were experimentally produced, which had similar structures to those in Example 11.

In order to seek the reason why the cycle life characteristics or battery capacity of the Ni—Zn secondary battery charged by the pulsed current are superior to those charged by the DC current, a comparison test was carried out for the two samples of sealed Ni—Zn secondary battery.

In the test, the pulsed current used for charging was adjusted for one sample to have a pulse repetition frequency of 50 Hz with a pulse duty ratio of 50%. It was cycled that the test sample was discharged up to 100% with a current of 200 mA after charged up to 100% with the above-mentioned pulsed current of 80 mA. For comparison, another test sample was charged by use of a DC current of 80 mA. It was also cycled that the test sample was discharged up to 100% with a current of 200 mA after charged up to 100% with the DC current of 80 mA.

Figure 20A:
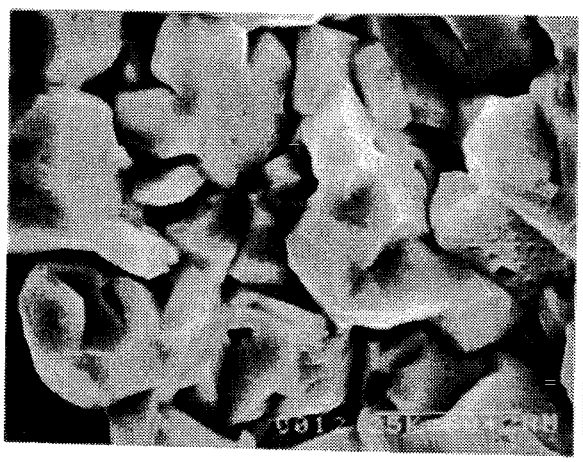
FIGS. 20(a) and 20(b) each show a couple of photos showing microstructure of a surface of a negative electrode of a Ni—Zn battery charged according to a thirteenth example, FIG. 20(a) being after charged by a pulsed current, and FIG. 20(b) being after charged by a DC current.
Figure 20B:
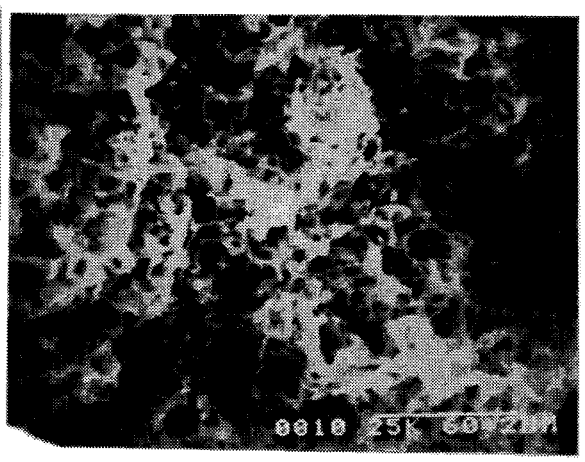

Then, the microstructure of a surface of a negative electrode of each sample was observed by use of a scanning electron microscope (SEM). FIG. 20(a) shows the SEM photo of the sample charged by the pulsed current. FIG. 20(b) shows that of the sample charged by the DC current.

It is noted from FIGS. 20(a) and 20(b) that typical zinc crystal has been deposited on the surface of the negative electrode of the sample charged by the pulsed current, while dendrite crystal has grown on the surface of the negative electrode of the sample charged by the DC current.

In view of the results of the above-mentioned comparison tests in Examples 11 and 12 and the SEM photos in Example 13, it is readily understood that a growth of the dendrite crystal on a surface of a negative electrode causes a deterioration of cycle life characteristics in the Ni—Zn secondary battery.

Thus, the method according to the present invention can prevent the Ni—Zn secondary battery from being deteriorated in the cycle life characteristics and short-circuited due to such a growth of the dendrite crystal. Furthermore, there can be provided a Ni—Zn secondary battery which is able to be rapidly charged, according to the present invention.

While this invention has thus far been described with respect to only several embodiments thereof, it will be readily possible for those skilled in the art to put this invention into practice in various other manners. For example, the pulsed current is not limited to a pulse current as illustrated in FIG. 6. Namely, the term "pulsed current" as used, in the instant specification may include such a current as having a sinusoidal waveform, such a current as having a sawtooth waveform, and the like. Moreover, the charging apparatus illustrated in FIG. 2 must not be used to supply the pulsed current to the secondary battery. Alternatively, a half-wave rectified current may be supplied to the secondary battery by use of an AC power source and a rectifier.

What is claimed is:

1. A method for charging a secondary battery comprising a positive electrode, a negative electrode made of lithium, and an electrolyte, said method comprising the steps of:

producing a pulsed current which has a predetermined repetition frequency from 50 Hz to 10 MHz, inclusive, and which has a positive pulse amplitude sufficient to produce a predetermined current density of from 1 $\mu A/cm^2$ to 1 $mA/cm^2$, inclusive, in said positive electrode, said pulsed current comprising a positive pulsed current followed by a negative pulsed current, said positive pulsed current having said positive pulse amplitude sufficient to produce said predetermined current density of from 1 $\mu A/cm^2$ to 1 $mA/cm^2$, inclusive, in said positive electrode, and said negative pulsed current having a negative pulse amplitude sufficient to produce a second current density less than said predetermined current density, said second current density not being greater than a quarter of said predetermined current density; and supplying said pulsed current to said secondary battery to make the pulsed current flow between said positive electrode and said negative electrode through said electrolyte to thereby charge said secondary battery.

2. A method as claimed in claim 1, wherein said predetermined repetition frequency is from 1 kHz to 10 Mhz, inclusive.

3. A secondary battery charged by a method as claimed in claim 1, wherein said secondary battery comprises a separator separating said positive electrode and said negative electrode, said separator having a thickness not greater than 0.25 mm.

4. A method as claimed in claim 1, wherein said predetermined repetition frequency is from 100 Hz to 10 kHz, inclusive.

5. A method as claimed in claim 2, wherein said predetermined repetition frequency is from 5 kHz to 10 MHz, inclusive.

* * * * *